(12) United States Patent
Agata et al.

(10) Patent No.: US 6,774,959 B2
(45) Date of Patent: Aug. 10, 2004

(54) LIQUID CRYSTAL DISPLAY DEVICE AND INFORMATION PROCESSING APPARATUS

(75) Inventors: Yasuaki Agata, Kanagawa (JP); Masanori Akiyama, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/196,931

(22) Filed: Jul. 16, 2002

(65) Prior Publication Data

US 2003/0016489 A1 Jan. 23, 2003

(30) Foreign Application Priority Data

Jul. 17, 2001 (JP) .................................... 2001-216405

(51) Int. Cl.[7] .......................................... G02F 1/1333
(52) U.S. Cl. .................................... 349/58; 361/681
(58) Field of Search ........................ 349/58; 361/681, 361/682, 683

(56) References Cited

U.S. PATENT DOCUMENTS

| | | | | |
|---|---|---|---|---|
| 5,499,129 A | * | 3/1996 | Satou et al. ................... | 349/58 |
| 5,570,267 A | * | 10/1996 | Ma .............................. | 349/58 |
| 5,768,095 A | * | 6/1998 | Nakamura et al. ............ | 361/681 |
| 6,046,785 A | * | 4/2000 | Won ............................ | 349/58 |
| 6,330,148 B1 | * | 12/2001 | Won et al. .................... | 349/58 |
| 6,411,501 B1 | * | 6/2002 | Cho et al. .................... | 361/681 |
| 6,421,231 B1 | * | 7/2002 | Jung ........................... | 361/681 |
| 6,525,790 B1 | * | 2/2003 | Kan-o .......................... | 349/58 |
| 2002/0080299 A1 | * | 6/2002 | Yun et al. ..................... | 349/58 |

* cited by examiner

Primary Examiner—Diane I. Lee
Assistant Examiner—Kumiko C. Koyama
(74) Attorney, Agent, or Firm—Frommer Lawrence & Haug LLP; William S. Frommer; Matthew K. Ryan (57) ABSTRACT

A liquid crystal display device including a liquid crystal panel provided with fitting screw insertion holes respectively at a pair of side surfaces thereof, a pair of brackets including a holding portion covering one side surface of the liquid crystal panel, and flat plate portions formed at both ends of the side surface in parallel to the liquid crystal surface and a liquid crystal casing including a rear panel and a front panel covering the liquid crystal panel. In the liquid crystal display device, the pair of the brackets are screwed respectively to both side surfaces of the liquid crystal panel through holes provided in the holding portions and the fitting screw insertion holes of the liquid crystal panel and are screwed to the inside of the liquid crystal casing through holes provided in the flat plate portions.

3 Claims, 10 Drawing Sheets

LIQUID CRYSTAL DISPLAY DEVICE AND INFORMATION PROCESSING APPARATUS

BACKGROUND OF THE INVENTION

The present invention relates to a liquid crystal display device and an information processing apparatus. More particularly, the invention relates to and a liquid crystal display device and an information processing apparatus which includes a main body portion including a keyboard and a panel portion including a liquid crystal panel, in which the panel portion is turnably supported on the main body portion through a hinge or hinges.

There are known information processing apparatuses in which a panel portion including a liquid crystal panel is turnably supported through a hinge or hinges on a main body portion having a keyboard including a plurality of operation keys arranged.

In such information processing apparatuses, there is one in which the liquid crystal panel is fitted to a casing of the panel portion through brackets, and the conventional methods of fitting include the following.

(1) Brackets formed integrally with hinges are used, the liquid crystal panel is fitted to the brackets, and the hinges and the brackets are fitted to the casing.

(2) Brackets formed integrally with hinges are fitted to the casing, other brackets are fitted to the liquid crystal panel, and the two kinds of brackets are connected to each other.

(3) Hinges are fitted to the casing, brackets formed independently of the hinges are preliminarily fitted to the casing, and the liquid crystal panel is fitted to the brackets preliminarily fitted to the casing.

The above-mentioned conventional methods of fitting, however, have the following problems respectively.

In the method of (1) above, at the time of replacing the liquid crystal panel with another liquid crystal panel differing in outside shape, it is necessary to change the casing to a casing which corresponds to the liquid crystal panel newly used, or to change the brackets formed integrally with the hinges to brackets having a shape corresponding to the liquid crystal panel newly used. Thus, the burden attendant on the replacement of the liquid crystal panel is heavy.

In the method of (2) above, two kinds of brackets are needed, so that weight is increased that much, and a large layout space is needed for laying out the brackets. Therefore, the panel portion is enlarged in size, and the number of component parts and cost are increased.

In the method of (3) above, the hinges are fitted separately from the brackets, so that the fitting strength of the hinges is low, which may result in that the support condition of the panel portion is unstable.

SUMMARY OF THE INVENTION

The present invention has been made so as to overcome the above-mentioned problems. Accordingly, it is an object of the present invention to provide an information processing apparatus in which a stable support condition of a panel portion relative to a main body portion is secured and reductions in the production cost and the cost of replacing a liquid crystal panel are contrived.

According to an aspect of the present invention, there is provided a liquid crystal display device including:

a liquid crystal panel provided with fitting screw insertion holes respectively at a pair of side surfaces thereof;

a pair of brackets including a holding portion covering one side surface of the liquid crystal panel, and flat plate portions formed at both ends of the side surface in parallel to the liquid crystal surface; and a liquid crystal casing including a rear panel and a front panel covering the liquid crystal panel, wherein the pair of the brackets are screwed respectively to both side surfaces of the liquid crystal panel through holes provided in the holding portions and the fitting screw insertion holes of the liquid crystal panel and are screwed to the inside of the liquid crystal casing through holes provided in the flat plate portions.

According to another aspect of the present invention, there is provided an information processing apparatus which includes a liquid crystal casing having a rear panel and a front panel covering a liquid crystal panel, and a main body portion having a keyboard provided with predetermined keys, the liquid crystal casing turnably fitted to the main body portion through hinges, the information processing apparatus comprising:

a pair of brackets including a holding portion covering one side surface of the liquid crystal panel, a flat plate portion formed at one end of the side surface in parallel to the liquid crystal surface, and a connection portion provided at the other end of the side surface, wherein the holding portion is screwed through a hole provided in the holding portion and a fitting screw insertion hole of the liquid crystal panel, the flat plate portion is screwed to the inside of the liquid crystal casing through a hole provided in the flat plate portion, and the connection portion is screwed to the inside of the liquid crystal casing through a hole provided in a fitted portion of the hinge disposed overlapping with the connection portion and a hole provided in the connection portion.

According to the present invention as mentioned above, the fitting strength of the hinges to the casing is enhanced, and a stable support condition of the panel portion relative to the main body portion can be secured.

In addition, according to the present invention, even in the case of replacing the liquid crystal panel with a new one differing in outside shape, it suffices to replace only the brackets with new ones having a shape corresponding to the new liquid crystal panel. Therefore, burden at the time of replacing the liquid crystal panel is little, and the liquid crystal panel can be easily replaced at low cost.

Further, according to the present invention, the holding portions of the brackets are fitted in the state of overlapping with side surfaces of the liquid crystal panel, so that each portion of the brackets is not present on each surface orthogonal to the side surfaces of the liquid crystal panel. Therefore, when the liquid crystal panel is disposed in the inside of the casing, space for disposing the brackets is not needed in the thickness direction of the casing, so that a thinner structure of the panel portion can be contrived.

Besides, according to the present invention, the connection portions of the brackets each include an overlapping portion to be fitted to the casing in the state of overlapping with the fitted portion of the hinge and a direct fitting portion to be fitted directly to the casing. Therefore, the fitting strength of the brackets onto the casing is high, and the torsion or camber would not easily be generated in the brackets at the time of turning the panel portion.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Embodiments of the information processing apparatus according to the present invention will be described below referring to the accompanying drawings.

Figure 1:
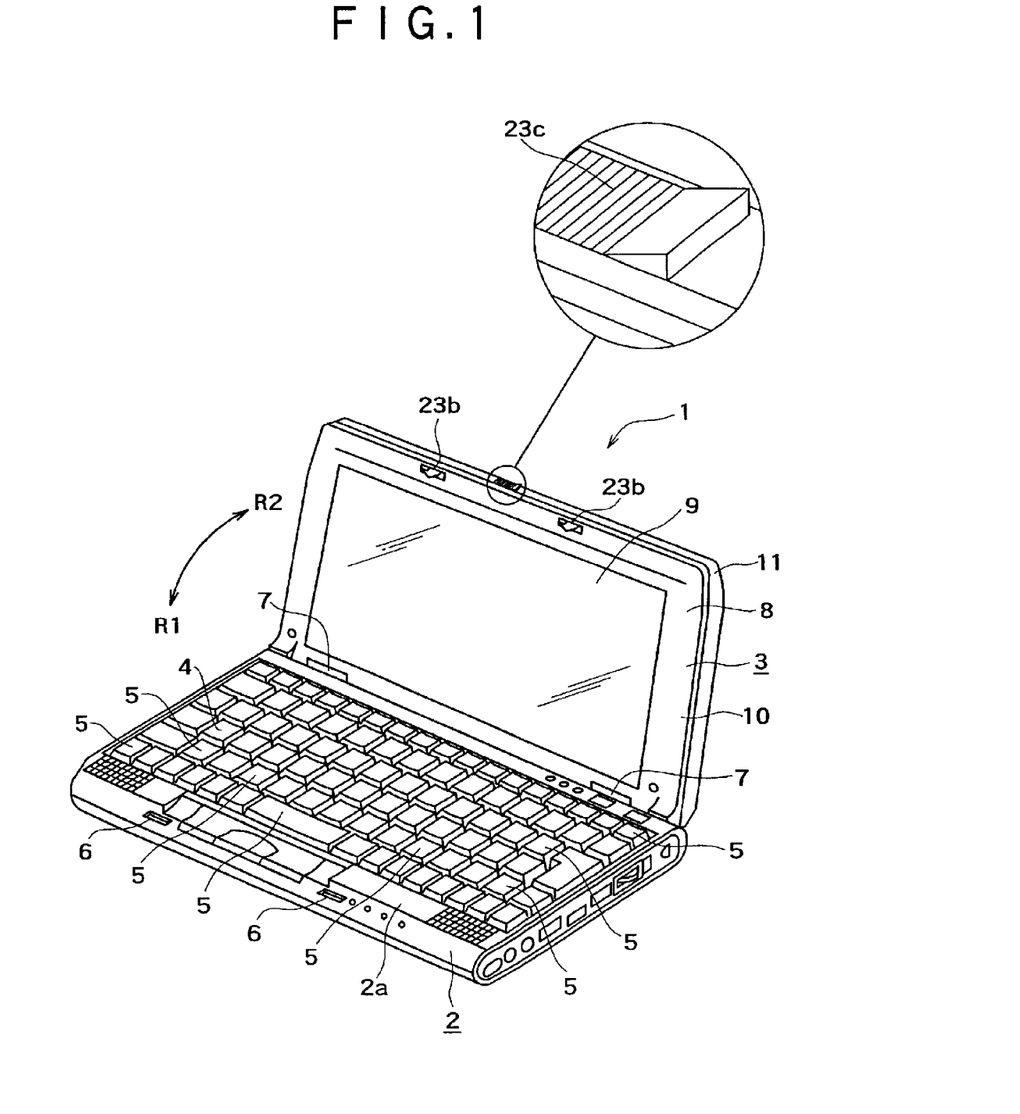
FIG. 1 is a perspective view of an information processing apparatus according to the present invention.

The information processing apparatus 1 includes a main body portion 2 and a panel portion 3 turnably supported on the main body portion 2 (See FIG. 1).

A keyboard 4 is provided at an upper surface portion 2a of the main body portion 2, and the keyboard 4 includes predetermined operation keys 5, 5 . . . arranged thereon (See FIG. 1). A processing means such as a CPU (central processing unit) is provided in the inside of the main body portion 2, and processing on signals inputted by operations on the operation keys 5, 5 . . . of the keyboard 4 are performed.

Lock pawl engaging holes 6, 6 spaced in the left-right direction are provided at a front end portion of the upper surface portion 2a of the main body portion 2 (See FIG. 1).

Disposing projected portions 7, 7 spaced in the left-right direction are provided at a rear end portion of the upper surface portion 2a of the main body portion 2, and the disposing projected portions 7, 7 are formed to be elongated in the left-right direction (See FIG. 1).

The panel portion 3 includes a liquid crystal panel 9 disposed in the inside of a casing 8 (See FIG. 1).

The casing 8 includes a front panel 10 and a rear panel 11 connected to each other (See FIG. 1). The front panel 10 is rectangular frame like in shape, and pawl disposing holes 10b, 10b spaced in the left-right direction are provided at one end portion 10a of the front panel 10 (See FIG. 2). The one end portion 10a is a portion overlapping with the front end portion of the main body portion 2 when the panel portion 3 is turned to close the keyboard 4. The other end portion 10c of the front panel 10 is provided with disposing cutouts 10d, 10d respectively at a portion near the left end and a portion near the right end.

Figure 3:
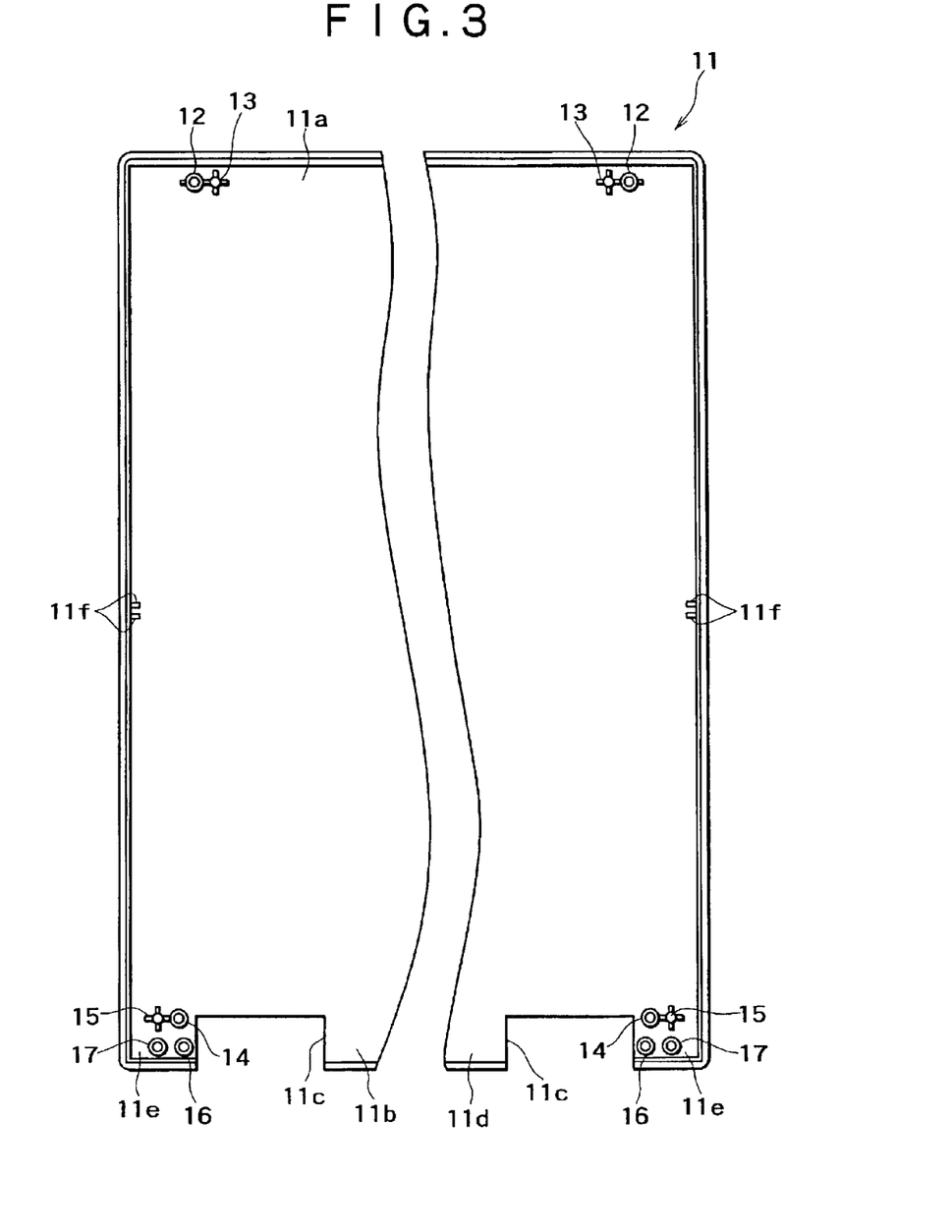
FIG. 3 is an enlarged front view of a portion of a rear panel.

The rear panel 11 is roughly rectangular in shape, and fitting bosses 12, 12 are provided respectively at a left end portion and a right end portion at the inside surface of one end portion 11a of the rear panel 11 (See FIG. 3). The rear panel 11 is provided with positioning pins 13, 13 on the direct inside of the fitting bosses 12, 12.

The other end portion 11b of the rear panel 11 is provided with disposing cutouts 11c, 11c respectively at a portion near the left end and a portion near the right end (See FIGS. 3 and 4), and the disposing cutouts 11c, 11c are located correspondingly to the disposing cutouts 10d, 10d of the front panel 10. The portion between the disposing cutouts 11c, 11c of the rear panel 11 is formed as a substrate disposing portion lid, and a right end portion and a left end portion of the other end portion 11b of the rear panel 11 are formed as fitting portions 11e, 11e.

The fitting portion 11e is provided with a first fitting boss 14 and a positioning pin 15 disposed side by side in the left-right direction (See FIG. 3). In addition, the fitting portion 11e is provided with a second fitting boss 16 and a third fitting boss 17 disposed side by side in the left-right direction, and the second fitting boss 16 and the third fitting boss 17 are smaller than the first boss 14 in height.

Figure 4:
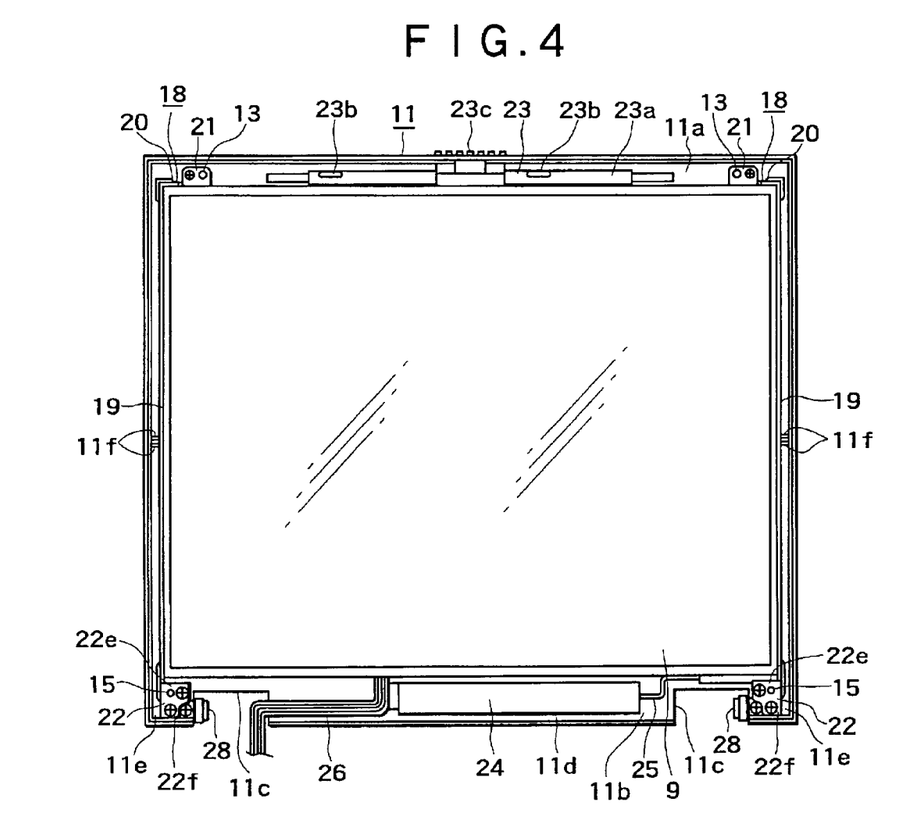
FIG. 4 is a front view of the rear panel in the condition where a liquid crystal panel is disposed.

The rear panel 11 is provided with presser pieces 11f, 11f respectively at roughly central portions of the left and right side edges thereof (See FIGS. 3 and 4).

Figure 7:
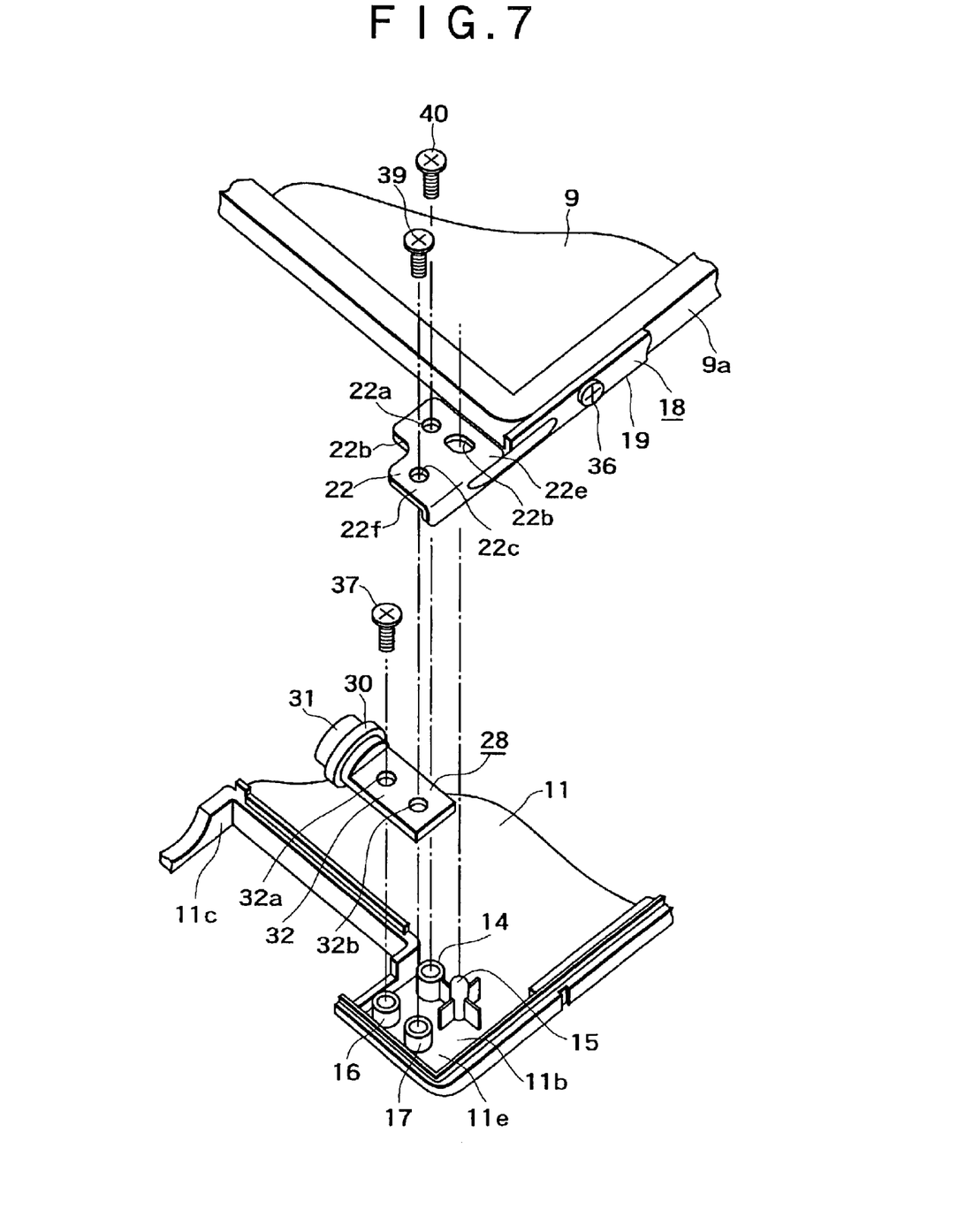
FIG. 7 is an exploded perspective view of a major part.

The liquid crystal panel 9 is fitted to the rear panel 11 through brackets 18, 18, which are fitted respectively to left and right side surfaces 9a, 9a of the liquid crystal panel 9 (See FIGS. 4 and 7).

Figure 5:
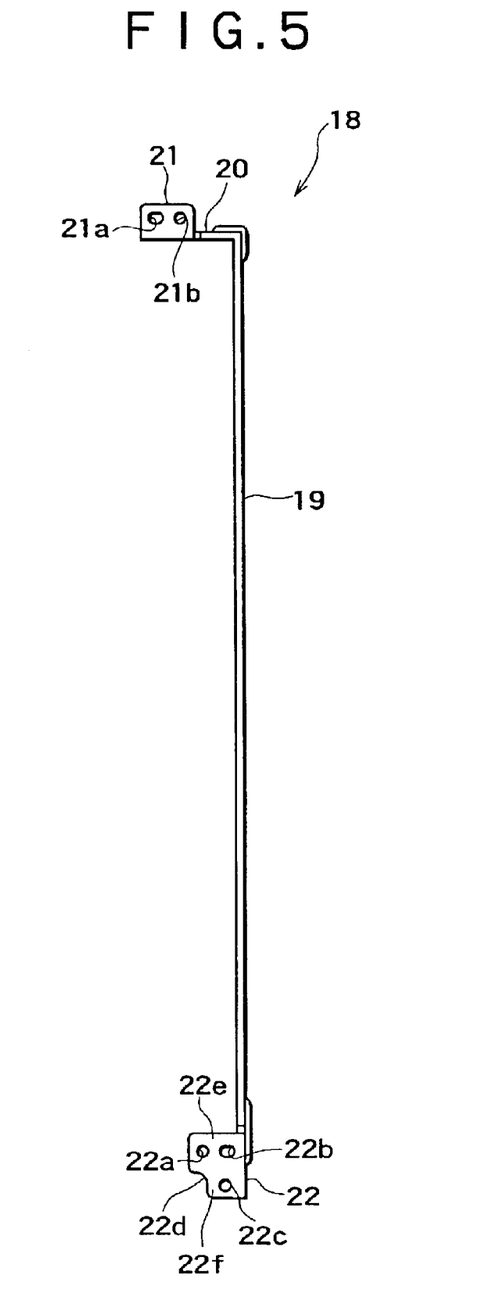
FIG. 5 is an enlarged front view of a bracket.

The bracket 18 includes a holding portion 19 having a flat plate like shape elongate in one direction, a bent portion 20 bent at a right angle from one end portion of the holding portion 19, a fitted surface portion 21 having a flat plate like shape provided at a tip end portion of the bent portion 20, and a connection portion 22 having a flat plate like shape provided at the other end portion of the holding portion 19, which are formed as one body (See FIG. 5).

The fitted surface portion 21 is provided with a positioning hole 21a and a screw insertion hole 21b disposed side by side in the left-right direction.

The connection portion 22 is provided with a first screw insertion hole 22a and a positioning hole 22b disposed side by side in the left-right direction. The connection portion 22 is provided with a second screw insertion hole 22c on the opposite side of the holding portion 19 with respect to the positioning hole 22b. In addition, the connection portion 22 is provided with a relief cutout 22d.

In the connection portion 22, the portion provided with the first screw insertion hole 22a and the positioning hole 22b is formed as a direct fitting portion 22e for direct fitting to the rear panel 11, and the portion provided with the second screw insertion hole 22c is formed as an overlapping portion 22f to be fitted to the rear panel 11 in the state of overlapping with a first member which will be described later.

On the one end portion 11a of the rear panel 11, a latch 23 is supported at a roughly central portion in the left-right direction so as to be slidable in the left-right direction (See FIG. 4). The latch 23 includes a supported portion 23a elongate in the left-right direction, lock pawls 23b, 23b provided on the supported portion 23a in the state of being spaced in the left-right direction, and a sliding knob 23c provided between the lock pawls 23b, 23b. The latch 23 is so constructed that the supported portion 23a is supported on the one end portion 11a of the rear panel 11, and, in the condition where the front panel 10 and the rear panel 11 are connected to each other to constitute the casing 8, the lock pawls 23b, 23b are projected through the disposing holes 10b, 10b of the front panel 10, and the sliding knob 23c is disposed on the outside of the casing 8 (See FIG. 1).

A circuit substrate 24 for driving the liquid crystal panel 9 is disposed at the substrate disposing portion 11d of the rear panel 11, and a cable 25 led out from the circuit substrate 24 is connected to the liquid crystal panel 9 (See FIG. 4). One end portion of a flexible printed substrate 26 is connected to the circuit substrate 24, and the other end portion of the flexible printed substrate 26 is connected to a driving circuit (not shown) provided in the inside of the main body portion 2.

The panel portion 3 is turnably supported on the main body portion 2 through hinges 27, 27. The hinges 27, 27 are included of first members 28, 28 fitted to the panel portion 3 and second members 29, 29 fitted to the main body portion 2, respectively (See FIG. 6).

Figure 6:
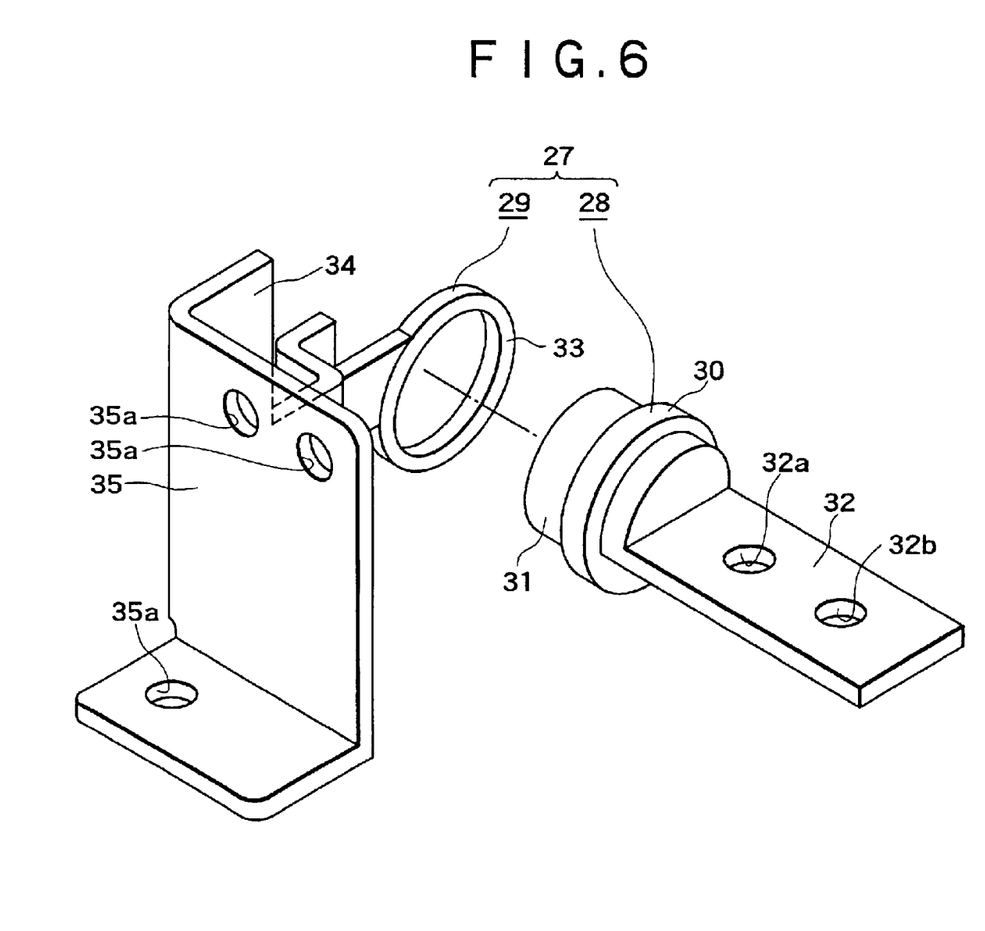
FIG. 6 is an enlarged perspective view of a hinge.

The first member 28 includes a circular disk form base portion 30, a turning fulcrum portion 31 having a cylindrical shape short in the axial direction projected to one side from the base portion 30, and a fitted portion 32 projected from the base portion 30 in the direction opposite to the turning fulcrum portion 31, which are formed as one body. The fitted portion 32 is rectangular flat plate like in shape, and is provided with a first screw insertion hole 32a and a second screw insertion hole 32b spaced in the direction of projection from the base portion 30.

The second member 29 includes an annular form support portion 33, a connecting portion 34 projected from the outer circumferential surface of the support portion 33, and a fitted portion 35 bent at a right angle from the connecting portion 34, which are formed as one body. The fitted portion 35 is provided with screw holes 35a, 35a, 35a.

Figure 8:
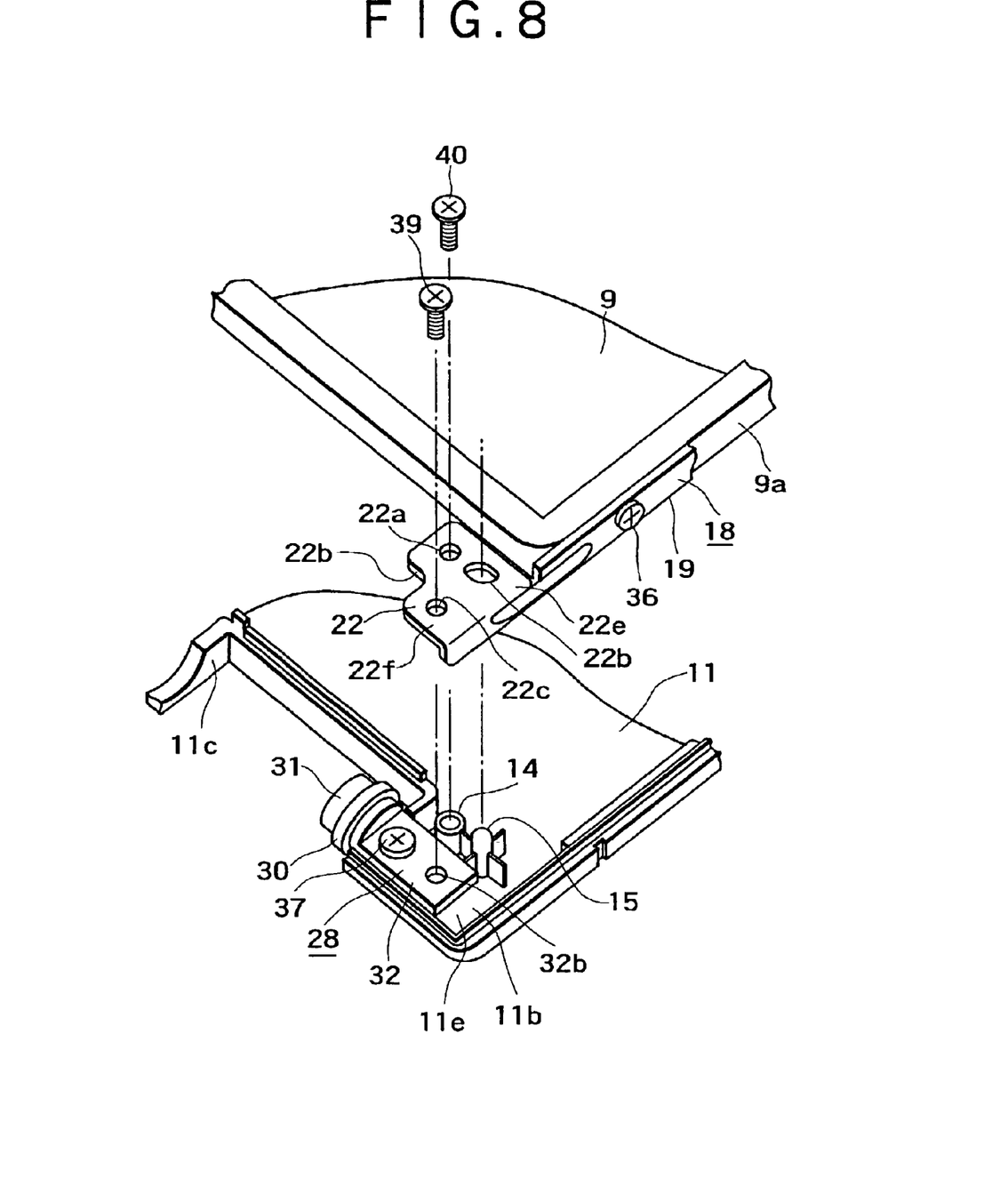
FIG. 8 is an enlarged perspective view showing the condition where a first member of the hinge is fitted to the rear panel.
Figure 9:
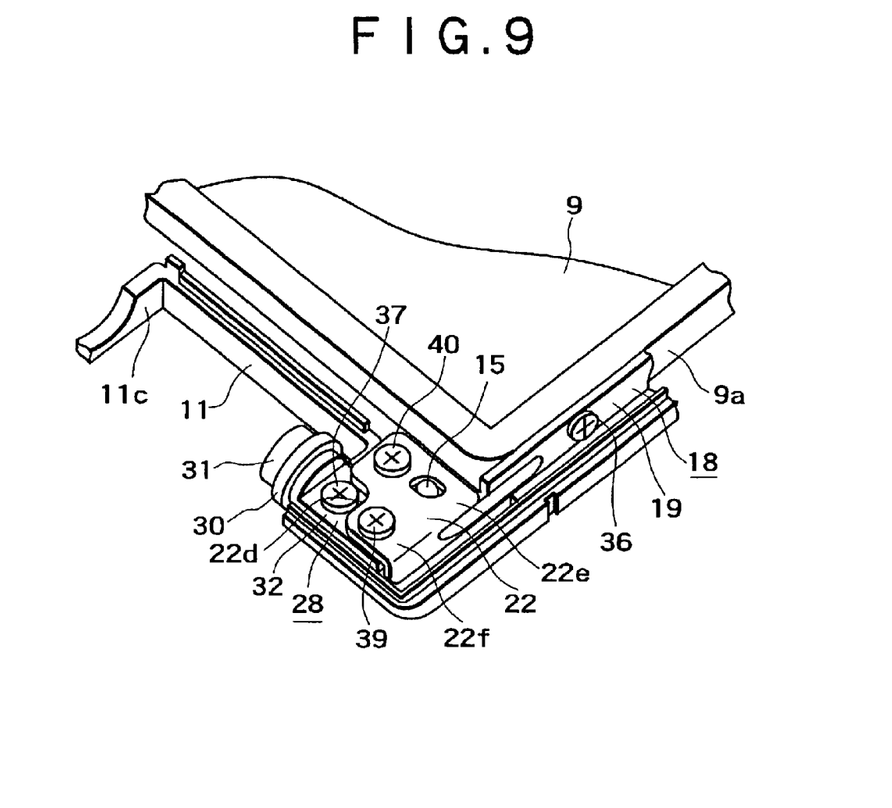
FIG. 9 is an enlarged perspective view showing the condition where the bracket and the first member are fitted to the rear panel.

Now, the procedure of fitting each of the above-mentioned portions will be described (FIGS. 7 to 9).

First, the brackets 18, 18 are fitted respectively to the side surfaces 9a, 9a of the liquid crystal panel 9 (See FIG. 7). The fitting of the bracket 18 to the side surface 9a is conducted by inserting fitting screws 36, 36 respectively through insertion holes (not shown) provided in the holding portion 19 of the bracket 18 and screwing the fitting screws 36, 36 into the side surface 9a. The holding portions 19, 19 are fitted in the state of overlapping with the side surfaces 9a, 9a from the lateral side, so that portions of the brackets 18, 18 are not present on surfaces orthogonal to the side surfaces 9a, 9a of the liquid crystal panel 9. Therefore, when the liquid crystal panel 9 is disposed in the inside of the casing 8, space for disposing the brackets 18, 18 is not needed in the thickness direction of the casing 8, and a thinner structure of the panel portion 3 can be contrived.

On the other hand, the turning fulcrum portions 31, 31 of the first members 28, 28 are preliminarily inserted respectively into the support portions 33, 33 of the second members 29, 29, and the second members 29, 29 are fitted respectively to predetermined fitting positions of the main body portion 2. The fitting of the second member 29 to the main body portion 2 is conducted by inserting fitting screws (not shown) respectively through the screw holes 35a, 35a, 35a of the fitted portion 35 and screwing the fitting screws into the main body portion 2. In the condition where the second members 29, 29 are fitted to the main body portion 2, the support portions 33, 33 of the second members 29, 29 and the turning fulcrum portions 31, 31 of the first members 28, 28 are disposed in the inside of the disposing projected portions 7, 7 of the main body portion 2, and the fitted portions 32, 32 of the first members 28, 28 are projected to a lateral side from the disposing projected portions 7, 7.

Next, the first members 28, 28 of the hinges 27 are fitted respectively to the fitting portions 11e, 11e of the rear panel 11 (See FIG. 8). The fitting of the first member 28 to the fitting portion 11e is conducted by inserting a fitting screw 37 through the first screw insertion hole 32a of the fitted portion 32 of the first member 28 and screwing the fitting screw 37 into the second fitting boss 16. In the condition where the first members 28, 28 are fitted to the fitting portions 11e, 11e, the disposing projected portions 7, 7 of the main body portion 2 are located respectively in the disposing cutouts 11c, 11c.

Figure 2:
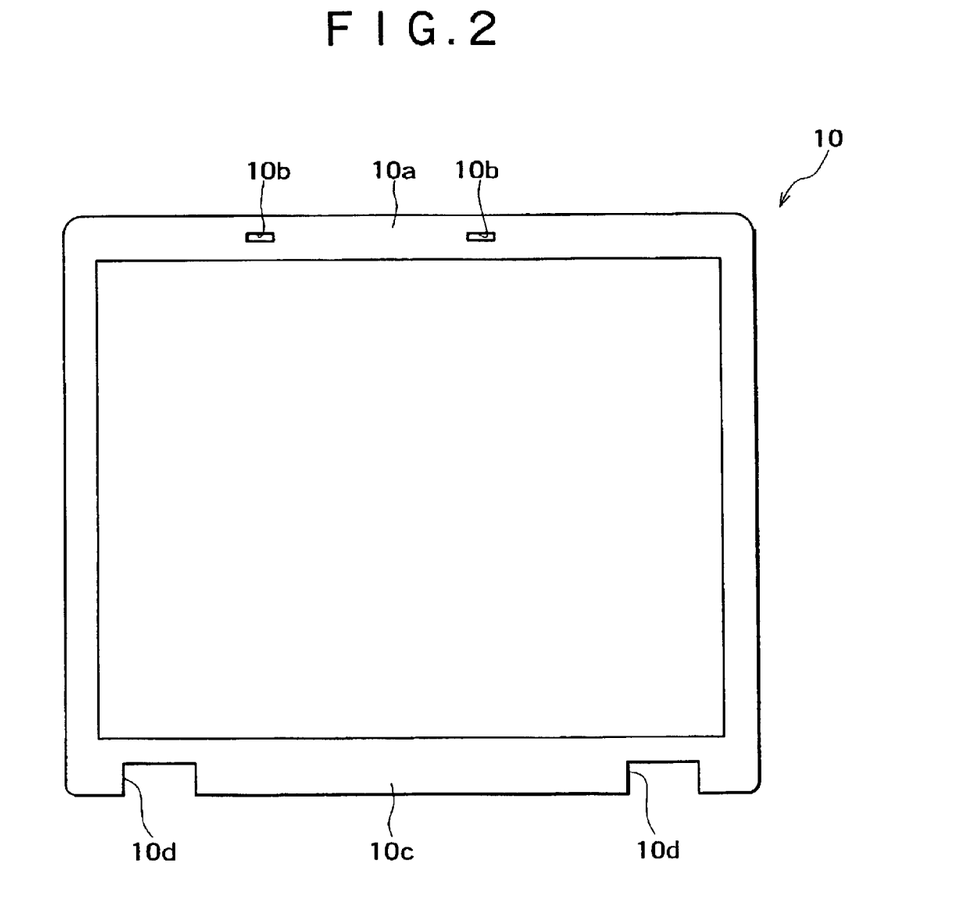
FIG. 2 is a front view of a front panel.

Next, the brackets 18, 18 are fitted to the rear panel 11 (See FIGS. 2 and 9). The fitting of the bracket 18 to the rear panel 11 is conducted by disposing the bracket 18 relative to the rear panel 11 so that the positioning pins 13, 15 on the rear panel 11 are inserted respectively in the positioning hole 21a of the fitted surface portion 21 and the positioning hole 22b of the connection portion 22 of the bracket 18, inserting a fitting screw 38 through the screw insertion hole 21b of the fitted surface portion 21, screwing the fitting screw 38 into the fitting boss 12, inserting a fitting screw 39 sequentially through the second screw insertion hole 22c of the connection portion 22 and the second insertion hole 32b of the first member 28, screwing the fitting screw 39 into the third fitting boss 17, inserting a fitting screw 40 through the first screw insertion hole 22a of the connection portion 22, and screwing the fitting screw 40 into the first fitting boss 14.

In the condition where the brackets 18, 18 are thus fitted to the rear panel 11, the overlapping portions 22f, 22f of the connection portions 22, 22 of the brackets 18, 18 overlap with parts of the fitted portions 32, 32 of the first members 28, 28 (See FIG. 9).

In the condition where the liquid crystal panel 9 fitted with the brackets 18, 18 is disposed on the rear panel 11, the holding portions 19, 19 of the brackets 18, 18 are pressed sideways respectively by the presser pieces 11f, 11f provided on the rear panel 11 (See FIG. 2).

Under the condition where the first members 28, 28 and the brackets 18, 18 holding the liquid crystal panel 9 are fitted to the rear panel 11 as described above, the front panel 10 is connected to the rear panel 11.

Under the condition where the panel portion 3 is turnably supported on the main body portion 2 as described above, when the panel portion 3 is turned in the direction R1 shown in FIG. 1, the keyboard 4 is closed with the panel portion 3; when the panel portion 3 is turned in the direction R2 shown in FIG. 1, the keyboard 4 is opened.

When the panel portion 3 is turned relative to the main body portion 2, the turning fulcrum portions 31, 31 of the first members 28, 28 are rotated while sliding relative to the support portions 33, 33 of the second members 29, 29, respectively.

When the keyboard 4 is closed, the lock pawls 23b, 23b of the latch 23 are engaged respectively with the opening edges of the lock pawl engaging holes 6, 6 formed in the main body portion 2, whereby the panel portion 3 is locked. Under the condition where the panel portion 3 is locked, when the sliding knob 23c of the latch 23 is slidden, the lock is released so that the panel portion 3 can be turned.

As has been described above, in the information processing apparatus 1, the overlapping portions 22f, 22f of the brackets 18, 18 are fitted to the rear panel 11 in the state of overlapping with parts of the fitted portions 32, 32 of the first members 28, 28 of the hinges 27, 27, so that the fitting strength of the first members 28, 28 to the rear panel 11 is enhanced, and a stable support condition of the panel portion 3 relative to the main body portion 2 can be secured.

In addition, in order to replace the liquid crystal panel 9 with a liquid crystal panel differing in outside shape, it suffices to change the brackets 18, 18 to new brackets having a shape corresponding to the new liquid crystal panel, so that the burden on replacement of the liquid crystal panel is light, and the liquid crystal panel can be easily replaced at low cost.

Further, in the information processing apparatus 1, the brackets 18, 18 are provided with direct fitting portions 22e, 22e to be fitted directly to the rear panel 11, separately from the overlapping portions 22f, 22f, so that the fitting strength of the brackets 18, 18 to the rear panel 11 is high, and the brackets 18, 18 will not easily suffer torsion or camber at the time of turning the panel portion 3.

In addition, the brackets 18, 18 are not fitted to left and right end portions of the rear panel 11 but fitted to the one end portion 11a and the other end portion 11b. Particularly, the one end portion 11a is the space where the latch 23 is laid out, and the spaces where the fitted surface portions 21, 21 of the brackets 18, 18 are fitted are the so-called dead spaces normally not used, so that a reduction in size of the panel portion 3 can be contrived through effective use of space.

Figure 10:
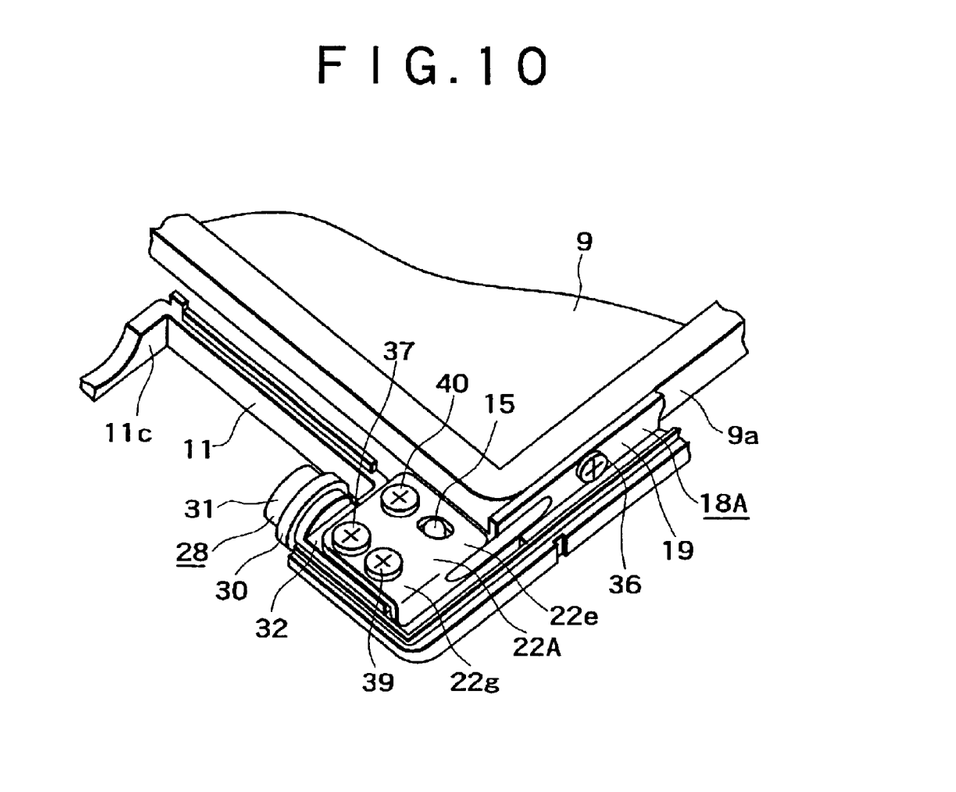
FIG. 10 is an enlarged perspective view showing the condition where another bracket and the first member are fitted to the rear panel.

While the example in which the first members 28, 28 are fitted to the rear panel 11 in the condition where parts of the brackets 18, 18 overlap with parts of the fitted portions 32, 32 of the first members 28, 28 has been described above, this is not limitative. For example, as shown in FIG. 10, the first members 28, 28 may be fitted to the rear panel 11 by use of brackets 18A, 18A such that overlapping portions 22g, 22g of connection portions 22A, 22A overlap with the entire parts of the fitted portions 32, 32. In this case, the fitting strength of the first members 28, 28 to the rear panel 11 is further enhanced, and a further stable support condition of the panel portion 3 relative to the main body portion 2 can be secured.

The concrete shapes and structures of the portions shown in the embodiments described above are mere examples for embodying or carrying out the present invention, and these are therefore not to be construed as limitative of the technical scope of the invention.

What is claimed is:

1. A liquid crystal display device comprising:
  a liquid crystal panel provided with fitting screw insertion holes respectively at a pair of side surfaces thereof;
  a pair of brackets including a holding portion covering one side surface of said liquid crystal panel, and flat plate portions formed at both ends of said side surface in parallel to the liquid crystal surface; and
  a liquid crystal casing including a rear panel and a front panel covering said liquid crystal panel,
  wherein said pair of brackets are screwed respectively to both side surfaces of said liquid crystal panel through holes provided in said holding portions and said fitting screw insertion holes of said liquid crystal panel and are screwed to the inside of said liquid crystal casing through holes provided in said flat plate portions, and wherein said holding portions are fitted so as to overlap with the side surfaces from a lateral side thereof so that said bracket is not present on surfaces orthogonal to the side surface of the liquid crystal panel.

2. An information processing apparatus which includes a liquid crystal casing having a rear panel and a front panel covering a liquid crystal panel, and a main body portion having a keyboard provided with predetermined keys, said liquid crystal casing turnably fitted to said main body portion through hinges,
  said information processing apparatus comprising:
  a pair of brackets including a holding portion covering one side surface of said liquid crystal panel, a flat plate portion formed at one end of said side surface in parallel to the liquid crystal surface, and a connection portion provided at the other end of said side surface,
  wherein said holding portion is screwed through a hole provided in said holding portion and a fitting screw insertion hole of said liquid crystal panel,
  said flat plate portion is screwed to the inside of said liquid crystal casing through a hole provided in said flat plate portion, and
  said connection portion is screwed to the inside of said liquid crystal casing through a hole provided in a fitted portion of said hinge disposed overlapped with said connection portion and a hole provided in said connection portion, and
  wherein said holding portion is fitted so as to overlap with the side surfaces from a lateral side thereof so that said bracket is not present on surfaces orthogonal to the side surface of the liquid crystal panel.

3. An information processing apparatus as set forth in claim 2, wherein said connection portion further comprises a hole for screwing without overlapping with said hinge.

* * * * *